US012276457B2

United States Patent
Fussbroich

(10) Patent No.: US 12,276,457 B2
(45) Date of Patent: Apr. 15, 2025

(54) METHOD FOR INDUCTIVELY HEATING STEEL INGOTS ON A TRANSPORT SHOE AND DEVICE FOR CARRYING OUT THE METHOD

(71) Applicant: SMS group GmbH, Düsseldorf (DE)

(72) Inventor: Klaus Fussbroich, Cologne (DE)

(73) Assignee: SMS group GmbH, Düsseldorf (DE)

( * ) Notice: Subject to any disclaimer, the term of this patent is extended or adjusted under 35 U.S.C. 154(b) by 594 days.

(21) Appl. No.: 17/421,101

(22) PCT Filed: Jan. 8, 2020

(86) PCT No.: PCT/EP2020/050309
§ 371 (c)(1),
(2) Date: Aug. 30, 2021

(87) PCT Pub. No.: WO2020/144229
PCT Pub. Date: Jul. 16, 2020

(65) Prior Publication Data
US 2022/0107134 A1   Apr. 7, 2022

(30) Foreign Application Priority Data

Jan. 8, 2019 (DE) ............ 10 2019 200 114.9
Mar. 8, 2019 (DE) ............ 10 2019 203 157.9

(51) Int. Cl.
*F27B 9/26* (2006.01)
*B21C 23/08* (2006.01)
(Continued)

(52) U.S. Cl.
CPC .............. *F27B 9/26* (2013.01); *B21C 23/085* (2013.01); *B21C 29/003* (2013.01); *C21D 1/42* (2013.01);
(Continued)

(58) Field of Classification Search
CPC ....... F27B 9/26; B21C 23/085; B21C 29/003; C21D 1/42; C21D 9/0025; C21D 9/0081;
(Continued)

(56) References Cited

U.S. PATENT DOCUMENTS 5,393,039 A * 2/1995 Smith ............... F27D 3/00
266/249
5,802,905 A   9/1998 Biswas et al.
(Continued)

FOREIGN PATENT DOCUMENTS

CN   108290197 B   11/2019
DE     4405027 A1  11/1994
(Continued)

OTHER PUBLICATIONS

Machine Translation of JP-2011127135-A (Year: 2011).*
Zlobina, M. et al. "Induction Heating for Aluminum Extrusion Process : Concepts , Simulation , Design." (2010).

*Primary Examiner* — Anthony M Liang
(74) *Attorney, Agent, or Firm* — Smartpat PLC

(57) ABSTRACT

A shell (10) acts as a transporting shoe for steel ingots, which are pushed through a preferably tubular induction furnace for inductive heating for the purpose of producing seamless tubes by the extrusion process. The shell (10) is formed in such a way that it partially reaches around the contour of the steel ingot to be heated. The shell is provided at one end leading in the pushing-through direction or transporting direction, with a shoulder (12), which extends at an angle to the transporting direction, against which the steel ingot rests in such a way that the pushed-through steel ingot takes the shell (10) along with it. A method for inductively heating steel ingots uses a shell (10) as described.

7 Claims, 3 Drawing Sheets

(51) Int. Cl.
*B21C 29/00* (2006.01)
*C21D 1/42* (2006.01)
*C21D 9/00* (2006.01)
*F27D 3/06* (2006.01)
*F27D 3/00* (2006.01)

(52) U.S. Cl.
CPC ......... *C21D 9/0025* (2013.01); *C21D 9/0081* (2013.01); *F27D 3/06* (2013.01); *F27D 2003/0003* (2013.01); *F27D 2003/0034* (2013.01)

(58) Field of Classification Search
CPC ............... F27D 3/06; F27D 2003/0003; F27D 2003/0034
See application file for complete search history.

(56) References Cited

U.S. PATENT DOCUMENTS

| | | | |
|---|---|---|---|
| 10,124,382 B2 | 11/2018 | Yamamoto et al. | |
| 2018/0359816 A1* | 12/2018 | Sitwala | F27B 9/36 |

FOREIGN PATENT DOCUMENTS

| | | | |
|---|---|---|---|
| JP | H116016 A | | 1/1999 |
| JP | 2003138315 A | | 5/2003 |
| JP | 2009299143 A | | 12/2009 |
| JP | 2009300132 A | | 12/2009 |
| JP | 2011127135 A | * | 6/2011 |
| KR | 20030030388 A | | 4/2003 |
| KR | 100807682 B1 | | 2/2008 |
| WO | 0120053 A1 | | 3/2001 |

* cited by examiner

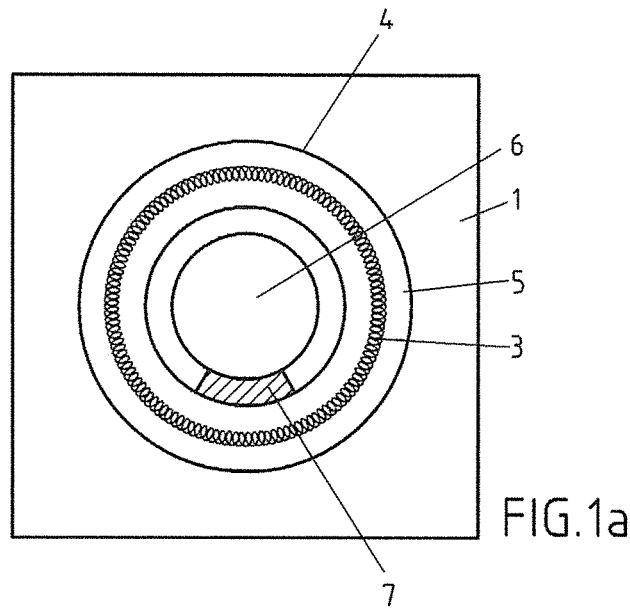
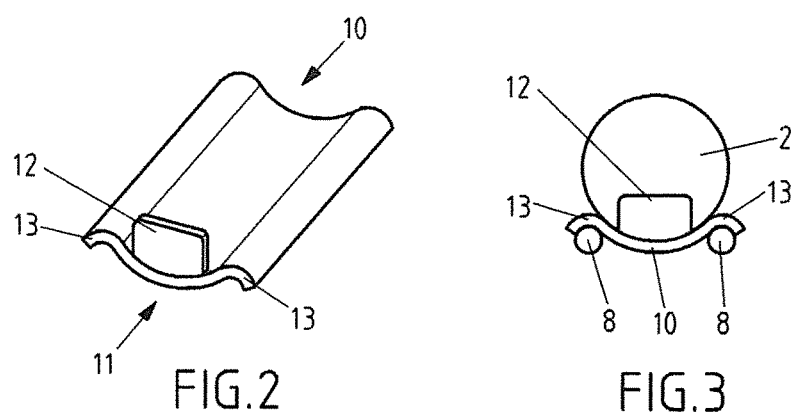
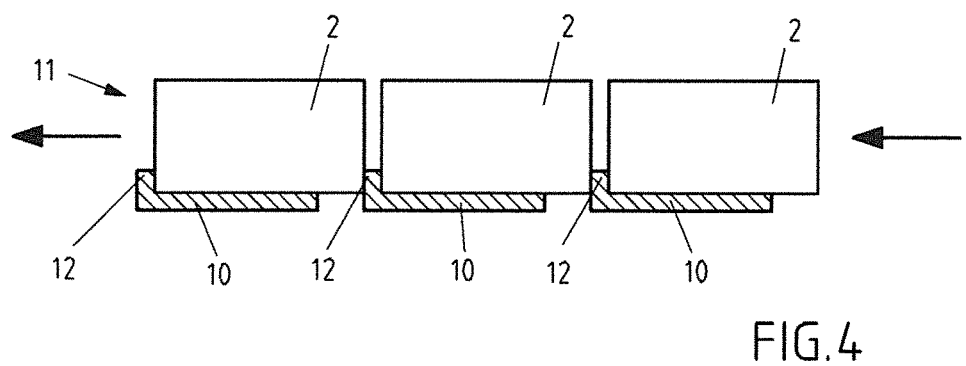

METHOD FOR INDUCTIVELY HEATING STEEL INGOTS ON A TRANSPORT SHOE AND DEVICE FOR CARRYING OUT THE METHOD

CROSS-REFERENCE TO RELATED APPLICATION

This application is a national stage application, filed under 35 U.S.C. § 371, of International Patent Application No. PCT/EP2020/050309, filed on 2020 Jan. 8, which claims the benefit of German Patent Applications Nos. 10 2019 200 114.9, filed 2019 Jan. 8, and 10 2019 203 157.9, filed 2019 Mar. 8.

TECHNICAL FIELD

The disclosure relates to a method for inductively heating steel ingots for the purpose of producing seamless tubes by the extrusion process with use of a non-magnetizable or non-inductive sheet as a transport shoe for the steel ingots and to a device for carrying out the method.

BACKGROUND

For the production of seamless steel tubes by means of the extrusion process, cylindrical ingots of steel are required, which are initially inductively preheated to a temperature of approximately 800° C. For this purpose, the steel ingots are usually placed individually on a roller table located in front of the inlet opening of an induction furnace and then pushed into the induction furnace by means of a hydraulically operated ram. The induction furnaces used are furnaces with cylindrical induction coils arranged one behind the other, which are cast in a horizontal arrangement in a horizontally extending concrete tube. The diameter of the concrete tube is only slightly larger than the diameter of the cylindrical steel ingots to be heated. Therefore, there is little space in the concrete tube for fixtures. As such, the steel ingots are pushed through on sheet metal strips or round steel bars in a stationary location inside the concrete tube or inside the induction furnace, as the case may be. The steel inserts in the form of sheet metal strips or round steel bars serve to counteract wear of the concrete tube caused by sliding friction.

The length of an induction furnace amounts to a multiple of the length of the respective steel ingot to be heated, for example, in the order of approximately 8 m. A column of a plurality of steel ingots is continuously pushed through the induction furnace, wherein a steel ingot fed into the induction furnace pushes forward a plurality of steel ingots already located in the induction furnace. At the end of the induction furnace, there is a compensating chamber, in which the foremost ingot in the ingot column is always solution heat treated.

This procedure has the disadvantage that, as the steel ingots heat up, scoring or grinding marks form on the outer surface of the steel ingots, leading to visible quality defects in the end product.

A feeding device for induction furnaces is known from KR 100807682 B 1, which, instead of a shell-shaped sheet metal strip extending through the induction furnace, provides a plurality of spheres mounted in spherical recesses of the concrete tube, which are in point contact with the workpiece. This is primarily to achieve a better distribution of the temperature within the workpiece. The problem of any visible damage to the surface of the workpiece is not addressed in this document.

A method for inductive heating of steel ingots is known from JP2011 127135 A, in which steel ingots are inductively brought to a softening temperature of over 1100° C. in three stages in several furnaces one after the other. In a first heating stage, the steel ingots are pushed through a first induction furnace in the usual manner in a block column. In a second or further stage, the steel ingots are then brought onto a tray by means of a robot, the tray being designed in such a way that the contact surface with the steel block is minimal.

From JP H11 6016 A1 a method for inductive heating of aluminum ingots is known in which the individual aluminum ingots are placed on shells made of refractory ceramic, which are pushed on guide rails through an induction furnace and heated there.

Further prior art is known from the documents US 2018/359816 A1 and WO 01/20053 A1.

The method disclosed herein improves the method according to JP2011 127135 A such that the removal of heated steel ingots from the support is simplified. The disclosure further provides a device for carrying out the method.

SUMMARY

For the method in accordance with this disclosure, a shell is provided as a transporting shoe for steel ingots, which are pushed through a preferably tubular induction furnace for inductive heating for the purpose of producing seamless tubes by the extrusion process. The shell is formed to partially reach around the contour of the steel ingot to be heated. The shell is provided at one end, leading through the induction furnace in the pushing-through direction or transporting direction, with a shoulder, which extends upwards at an angle to the transporting direction or with a driver, which rests against the steel ingot in such a way that the pushed-through steel ingot takes the shell along with it.

In an advantageous manner, the transporting shoe or shell separates the steel ingot to be heated from the substructure, i.e., from a sheet metal strip extending inside the induction furnace or from round steel bars extending inside the induction furnace. As a result, when the steel ingots are pushed through the induction furnace, there is no sliding friction between the outer surface of the steel ingot and the lining of the induction furnace or the guide means inside the induction furnace, as the case may be. The driver shoulder provided on the shell has the function of a driver, which ensures that the shell or transporting shoe, as the case may be, remains undetachable on the steel ingot when it is pushed through the induction furnace. The steel ingots used for the production of seamless tubes are naturally cylindrical, such that expediently the shell has a cylindrical shell surface and the shell surface has a radius of curvature that is approximately equal to the radius of curvature of the shell surface of the steel ingot. The shoulder extends expediently in the direction of the cavity enclosed by the cylindrical shell surface, i.e., pointing inwards and upwards in the transporting direction. For example, the shoulder can extend at a right angle to the axis of symmetry of the shell.

The shell is made of a non-magnetizable or non-inductive sheet, as the case may be.

In a preferred variant, the shell has centering means that cooperate with suitably formed guide means of the induction furnace. For example, the shell can have centering shoulders as centering means, which extend parallel to an axis of symmetry of the shell and which cooperate with round steel bars of the induction furnace as guide means. The centering shoulders preferably extend radially outward with respect to the curvature of the shell surface.

Instead of centering shoulders, beads or runners can also be provided on the outer shell surface, which extend parallel to the axis of symmetry or longitudinal axis, as the case may be, of the shell.

The object underlying the disclosure is achieved by a method for inductively heating steel ingots for the purpose of producing seamless tubes by the extrusion process using at least one shell of the type described above. The method comprises the following method steps:

a) Extracting a shell from a shell magazine,
b) Placing the shell on an insertion device, such that the shoulder comes to rest at the end leading in the transporting direction and points upwards against the direction of gravity,
c) Placing the steel ingot on the shell,
d) Sliding the assembly of the shell with the steel ingot located thereon into the induction furnace, wherein the assembly of shell and steel ingot thereby pushes forward a steel ingot, if any, already located in the induction furnace on a shell,
e) Pulling out the heated steel ingot on the shell and with the shell from the induction furnace,
f) Separating the heating steel ingot from the shell and
g) Repeating the method steps a) to f), if necessary.

For example, a slide-in roller table can be provided as an insertion device, which is arranged in alignment in front of the relevant induction furnace.

It is expedient to extract the shell from the shell magazine by means of a lifting device and to place it on a slide-in roller table, then to place the steel ingot on the shell located on the slide-in roller table, and to push the assembly comprising the shell and the steel ingot from the slide-in roller table into the induction furnace by means of a hydraulic ram. In an advantageous manner, the lifting device can be formed as a vacuum lifting device.

The method may comprise the parallel operation of a plurality of induction furnaces. In such a case, it is expedient if a plurality of slide-in roller tables are provided. In such a case, cold steel ingots can be fed via a single transport means, for example via a feed roller table, to a loading station, at which the shells are loaded with the cold steel ingots.

It is particularly advantageous if a plurality of shell magazines are provided, which enable a continuous process cycle. It is expedient to monitor the fill level of the shell magazines by means of sensors, such that, depending on the fill level, shells can be extracted alternately from one or the other shell magazine. For example, while shells are being extracted from one shell magazine, the shells released in the process can be fed to the other shell magazine.

The object underlying the disclosure is further achieved by a device for carrying out the method described above, comprising at least one tubular induction furnace, at least one shell magazine with a plurality of shells of the type described above, at least one transport means for providing shells at a loading station, at least one transport means for supplying cold steel ingots to the loading station, at which in each case a cold steel ingot is placed on a shell, at least one device for sliding in steel ingots placed on the shells, means for extracting heated steel ingots from the induction furnace, at least one transport means for outfeeding the heated steel ingots, and means for separating the heated steel ingots from the shells.

The device can include at least one stationary feed roller table for cold steel ingots, a slide-in roller table for receiving shells with steel ingots placed thereon, at least one extraction roller table, and at least one outfeed roller table. The device can include a plurality of induction furnaces. The feed roller table and the outfeed roller table can each be assigned to a plurality of induction furnaces.

A preferred variant of the device is characterized in that a transport means, preferably the outfeed roller table, has, as a means for separating the heated steel ingots from the shells, at least one stop, which acts directly against an end face of the steel ingot leading in the transporting direction of the heated steel ingot, and which is arranged in such a way that it acts as a stripper for the shell when the assembly of the shell and the steel ingot is lifted.

The stop can be formed, for example, as a yoke arranged above the transport means, the height of which is selected such that one end face of the heated steel ingot abuts against the yoke, such that the shell is moved further on the transport means. If the shell remains attached to the heated steel ingot, lifting the steel ingot causes the shell to be stripped from the yoke when an upwards facing edge of the shoulder of the shell abuts the underside of the yoke.

BRIEF DESCRIPTION OF THE DRAWINGS

FIG. 1*a* shows a schematic cross-section through an induction furnace for preheating cylindrical steel ingots, wherein the induction furnace is lined on the inside with a partially cylindrical sheet strip.

FIG. 1*b* schematically illustrates a variant of the induction furnace, in which round steel bars extend on the inside.

FIG. 2 shows a perspective illustration of a shell as a transporting shoe.

FIG. 3 shows a front view of a shell that is loaded with a steel ingot, in its position supported on round steel bars.

FIG. 4 schematically shows the assembly of a plurality of steel ingots, each to be provided with a shell or transport, as the case may be, in an ingot column as it results inside the induction furnace.

DETAILED DESCRIPTION

Figure 5:
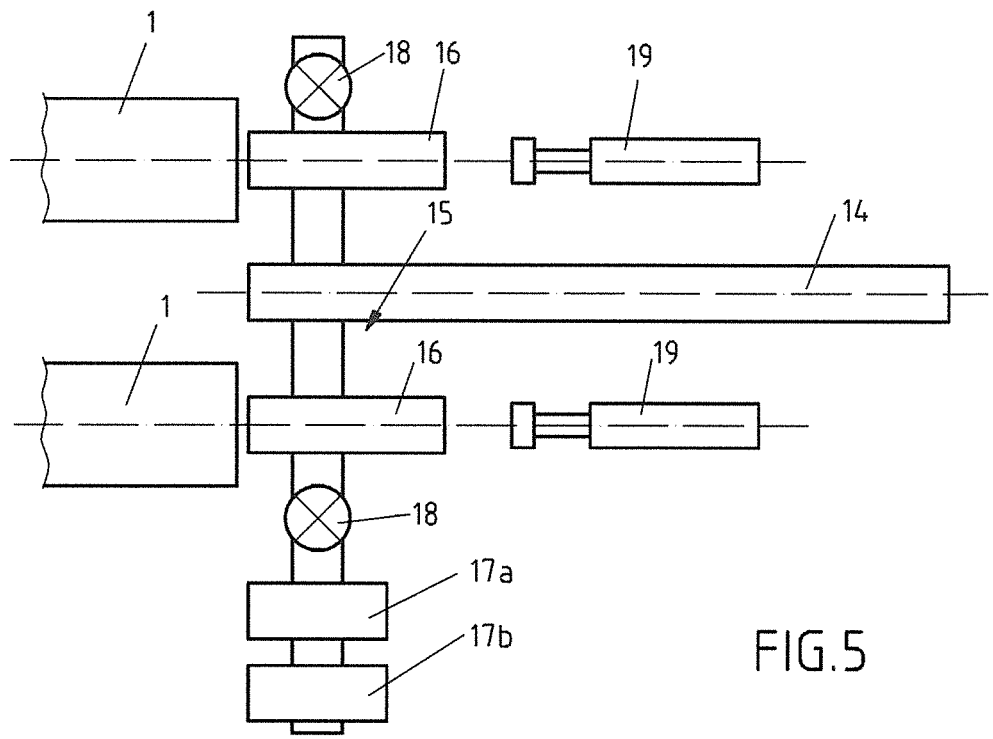
FIG. 5 shows a schematic top view of an assembly of induction furnaces on the feed side and the devices for feeding the induction furnaces with cold steel ingots.

FIGS. 1*a* and 1*b* show a cross-section of an induction furnace 1 for the inductive preheating of cylindrical steel ingots 2, which are to undergo further processing in an extrusion process to produce seamless steel tubes. For this purpose, the steel ingots 2 are preheated to a temperature of approximately 800° C. in a horizontal position in the induction furnace 1. Preheating is performed by a plurality of induction coils 3 arranged in series in the induction furnace 1, which induce eddy currents in the steel ingot 2 concerned, thereby heating it.

The induction furnace 1 has a cylindrical cross-section and comprises an outer steel shell 4 and an inner concrete lining 5, in which the induction coils 3 are cast. The furnace chamber 6 is formed to be hollow-cylindrical, its clear cross-section being only slightly larger than the cross-section of the steel ingots 2 to be heated. The steel ingots 2 to be heated are inserted on the feed side into the tube formed by the induction furnace 1, wherein an ingot column of a plurality of steel ingots 2 arranged one behind the other is formed in the tube, which is up to 8 m long, for example. One steel ingot 2 fed at a time pushes the steel ingots 2 located in the induction furnace 1 further. At the end of the induction furnace 1, there is a compensating chamber 9 (FIG. 6) in which the foremost steel ingot 2 in the ingot column is solution heat treated. To protect the concrete lining 5, it is provided either with a partially cylindrical sheet metal strip 7 arranged at the bottom in the installation position (variant in accordance with FIG. 1 *a*) or with at least two round steel bars 8 (variant in accordance with FIG. 1 *b*) also arranged at an angular distance from one another in the bottom in the installation position. Both the sheet metal strip 7 and the round steel bars 8 extend from one end to the respective opposite end of the induction furnace 1. Within the induction furnace 1, the steel ingots 2 experience increasing heating from one end to the opposite end and an associated increasing softening. In the process, the steel ingots 2 slide either on the sheet metal strip 7 or on the round steel bars 8, which would normally result in the shell surface or outer skin, as the case may be, of the steel ingots 2 being damaged.

To prevent such damage, a shell 10 is provided, which is used as a transporting shoe for one steel ingot 2 at a time. The shell 10 is shown in perspective in FIG. 2. The shell 10 forms a base for one steel ingot 2 at a time, which slides over the round steel bars 8 or over the sheet metal strip 7 of the induction furnace 1 with the steel ingot 2 placed on it.

As shown in FIG. 2, the shell 10 is formed as a partially cylindrical, upwardly open trough, whose radius of curvature corresponds approximately to the radius of the shell surface of a steel ingot 2. The shell 10 is provided at an end 11 leading in the transporting direction with a shoulder 12 that extends perpendicularly to the transporting direction and upwards transversely thereto, and rests against an end face of the steel ingot 2 leading in the transporting direction. The shoulder 12, which is formed to be a simple stop, causes a steel ingot 2 resting on the shell 10 to carry the shell 10 along as it is pushed through the induction furnace 1.

The shell 10 is provided with a centering shoulder 13 on each of its longitudinal sides running parallel to the longitudinal axis or axis of symmetry, which, as shown in FIG. 3, cooperates with the round steel bars 8 inside the induction furnace 1 in such a way that it counteracts the rotation of the steel ingot 2 and the shell 10 about the longitudinal axis.

Instead of the centering shoulders 13, the shell 10 can be provided on its underside on the outside, for example, with sliding runners, ribs or beads, which likewise counteract the rotation of the assembly of shell 10 and steel ingot 2 within the induction furnace 1, for example in cooperation with the sheet metal strip 7.

The method is explained below with reference to FIGS. 5 to 8. FIG. 5 shows the feed side of an assembly of two induction furnaces 1. The induction furnaces 1 are arranged side by side and parallel to one another. Cold steel ingots 2 are brought to a loading station 15 via a feed roller table 14. Two slide-in roller tables 16 are also provided. A first shell magazine 17A and a second shell magazine 17B are arranged parallel to the slide-in roller tables 16. For example, a shell 10 is extracted from the first shell magazine 17A by means of a lifting device 18, which is designed as a vacuum lifting device, and placed on a slide-in roller table 16. An ingot loader, not shown, is used to place a steel ingot 2 from the feed roller table 14 onto the shell 10 located on the slide-in roller table 16. The slide-in roller table is arranged in front of an induction furnace 1 such that the relevant steel ingot 2 is aligned with the underlying shell 10 in front of the furnace tube. A hydraulic cylinder assembly 19 (ingot pusher) is then used to push a steel ingot 2 into the relevant induction furnace 1, wherein the ingot column shown in FIG. 3 is displaced within the induction furnace 1. As a result, the steel ingot 2 leading in the ingot column enters the compensating chamber 9 shown schematically in FIG. 6 at the end on the discharge side of the induction furnace 1.

Figure 6:
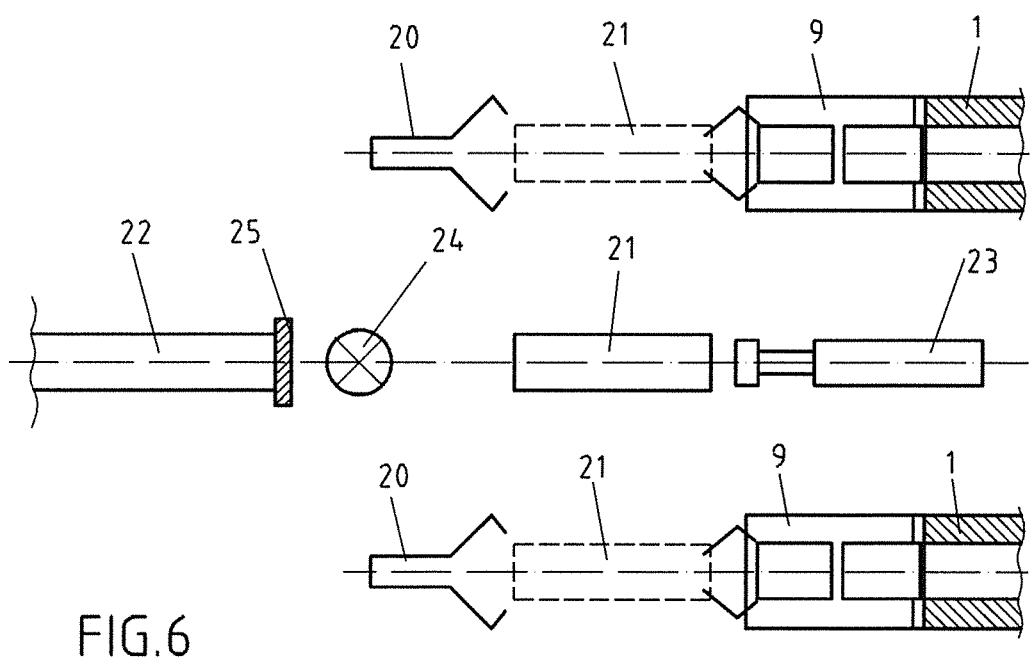
FIG. 6 shows a schematic top view of an assembly of induction furnaces on the discharge side and the devices for outfeeding heated steel ingots.
Figure 7:
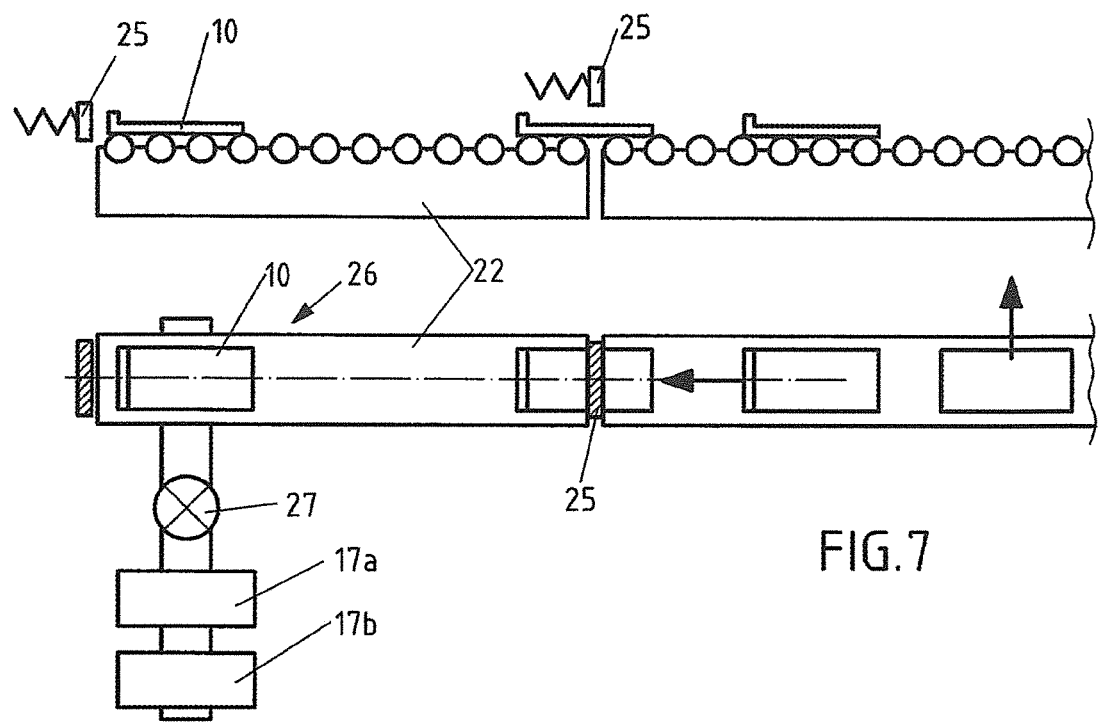
FIG. 7 shows a schematic top view of an assembly of transport devices on the discharge side, on the basis of which the collection of empty shells is illustrated.

With reference to FIG. 6, the steel ingot 2 is pulled out of the compensating chamber 9 by means of extraction pliers 20 onto an extraction roller table 21. There, another hydraulic cylinder assembly 23 (ingot pusher) pushes the heated steel ingot 2 onto an outfeed roller table 22.

Via the outfeed roller table 22, the steel ingot 2 and the underlying shell 10 travel together to an ingot lifting device 24, which lifts the steel ingot 2 vertically for further processing. The transport movement of the assembly of the shell 10 and the heated steel ingot 2 is stopped by a stop 25 extending over the outfeed roller table 22, which is formed as a yoke or a bridge. The height of the stop 25 is selected such that lifting the heated steel ingot 2 with the ingot lifting device 24 would cause the shell 10 to be stripped from the steel ingot 2, in the event that the shell 10 sticks to the steel ingot 2. The shell 10, which either falls back onto or remains on the outfeed roller table 22, is transported separately from the steel ingot 2 on the outfeed roller table 22 to a shell extraction position 26 (see FIG. 7). The steel ingot 2 and the shell 10 together reach the position at which the stop 25 is located. The steel ingot 2 is lifted and the shell 10 remains in place or is stripped off, if it should adhere to the steel ingot 2. The shell 10 passes under the stop 25 until the steel ingot 2 held above it on the ingot lifting device 24 is free. The outfeed roller table 22 stops and the steel ingot 2 is immediately placed on the outfeed roller table 22. The stop 25 is swiveled upwards such that it clears the way for the steel ingot 2 located on the outfeed roller table 22. The outfeed roller table 22 starts or starts up again, as the case may be, and the shell 10 and the steel ingot 2 move separately to the next position.

At the shell extraction position 26, the shell 10 is returned to one of the shell magazines 17A, 17B by means of a shell manipulator 27.

Figure 8:
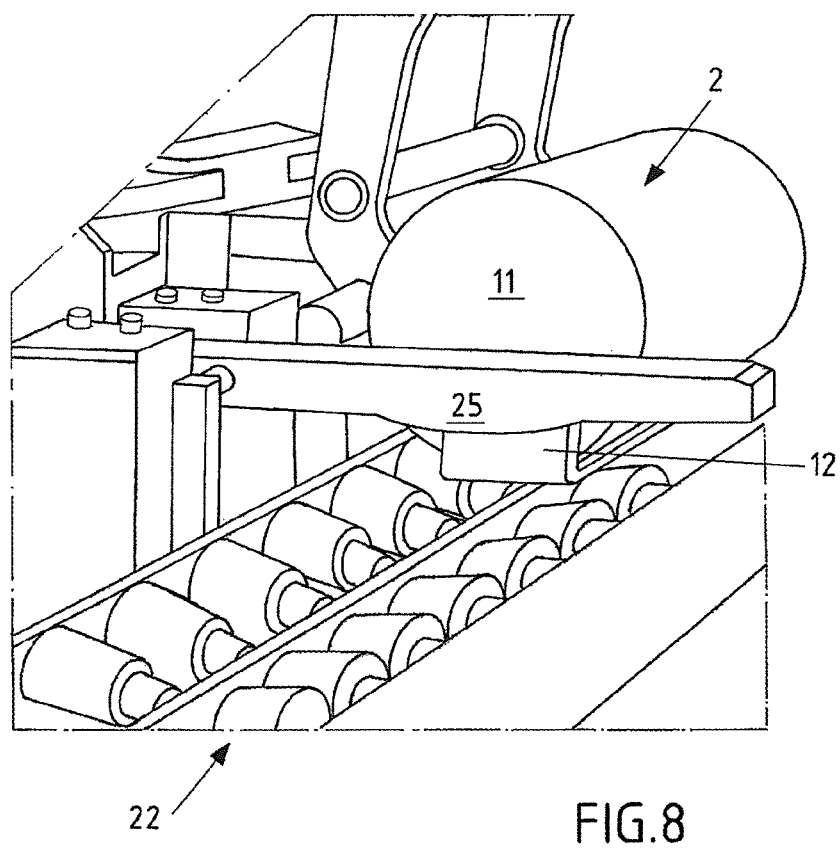
FIG. 8 shows a perspective illustration of a heated steel ingot in an ingot extraction position, in which the steel ingot rests against the stop.

FIG. 8 shows a perspective view of the assembly comprising a steel ingot 2 with the underlying shell on the outfeed roller table 22, wherein the leading end 11 of the steel ingot 2 rests against the stop 25.

LIST OF REFERENCE SIGNS

1 Induction furnace
2 Steel ingot
3 Induction coil
4 Steel shell
5 Concrete lining
6 Furnace chamber
7 Sheet metal strip 8 Round steel bars
9 Compensating chamber
10 Shell
11 Leading end of steel ingot 2
12 Shoulder
13 Centering shoulders
14 Feed roller table
15 Loading station
16 Slide-in roller tables
17 A First shell magazine
17 B Second shell magazine
18 Lifting device
19 Cylinder/ram assembly
20 Extraction pliers
21 Extraction roller table
22 Outfeed roller table
23 Cylinder/ram assembly
24 Ingot lifting device
25 Stop
26 Shell extraction position
27 Shell manipulator

The invention claimed is:

1. A method for inductively heating steel ingots for producing seamless tubes by an extrusion process, comprising the following steps:
   a) extracting a shell from a shell magazine,
      wherein the shell is made of a non-magnetizable or non-inductive sheet, and
      wherein the shell is formed such that it partially reaches around a contour of the steel ingot to be heated, and
      wherein the shell is provided at one end leading in a transporting direction with a shoulder, which extends at an angle to the transporting direction, against which the steel ingot rests in such a way that the steel ingot being pushed-through takes the shell along with it;
   b) placing the shell on an insertion device, such that the shoulder comes to rest at the end leading in the transporting direction and points upwards against the force of gravity;
   c) placing the steel ingot on the shell to form an assembly;
   d) sliding the assembly of the shell with the steel ingot located thereon into an induction furnace, wherein the assembly of the shell and the steel ingot thereby pushes forward a further steel ingot, if any, already located in the induction furnace on a further shell,
   e) pulling out the heated steel ingot on the shell and with the shell from the induction furnace;
   f) separating the heated steel ingot from the shell; and
   g) repeating the method steps a) to f),
      wherein the method steps a) to f) are carried out in the order in which they are listed,
      wherein separating the heated steel ingot from the shell according to method step f) takes place during a horizontal transport movement of the assembly consisting of the heated steel ingot and the shell on a horizontal transport means,
      wherein the horizontal transport movement of the steel ingot is stopped by a stop or at a stop,
      wherein the stop acts directly against an end face of the steel ingot leading in the transporting direction of the steel ingot, and
      wherein the stop is arranged in such a way that it acts as a stripper when the steel ingot is lifted off the shell, and
      wherein a height of the stop is selected such that lifting the heated steel ingot with an ingot lifting device causes the shell to be stripped from the steel ingot, in case the shell sticks to the steel ingot.

2. The method according to claim 1,
wherein the shell is extracted from the shell magazine by a lifting device and is placed on a slide-in roller table, and
wherein the steel ingot is subsequently placed on the shell located on the slide-in roller table, and
wherein the assembly comprising the shell and the steel ingot is pushed by a hydraulic ram from the slide-in roller table into the induction furnace.

3. The method according to claim 1,
wherein the heated steel ingot is pulled by extraction pliers with the shell out of a compensating chamber of the induction furnace onto an extraction roller table.

4. The method according to claim 1,
wherein the transport means is an outfeed roller table, and
wherein the ingot lifting device lifts the steel ingot vertically off the shell while the shell is on the outfeed roller table.

5. The method according to claim 4,
wherein the stop extends over the outfeed roller table in form of a yoke or a bridge.

6. The method according to claim 5, further comprising:
transporting the shell on the outfeed roller table to a shell extraction position after separating the ingot.

7. The method according to claim 6, further comprising:
returning the shell at the shell extraction position to one of the shell magazines by a shell manipulator.

* * * * *